July 5, 1955 HENRI-GEORGES DOLL 2,712,632
ELECTRICAL WELL LOGGING METHOD AND APPARATUS
Original Filed Nov. 18, 1948 3 Sheets-Sheet 1
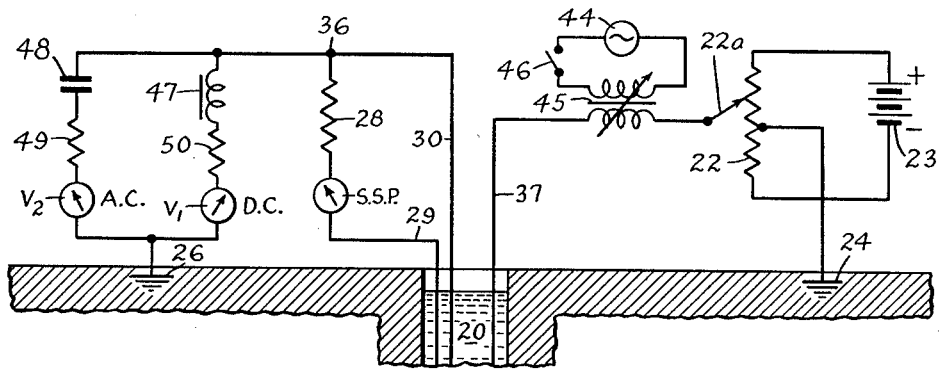
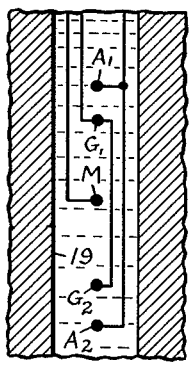
FIG.1.
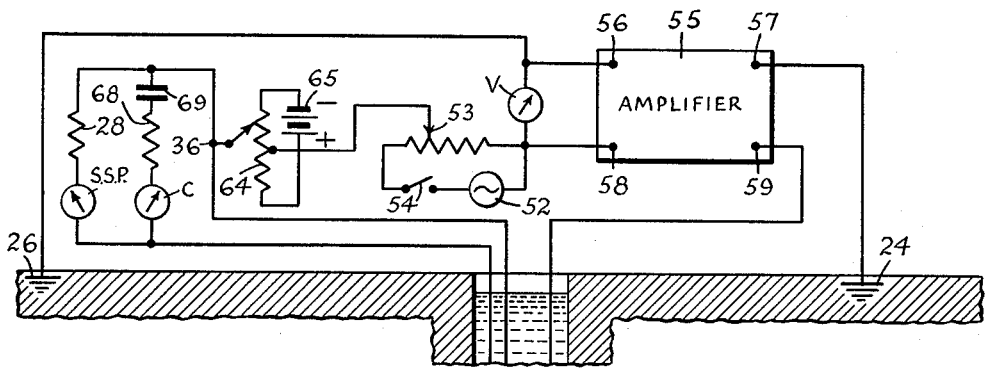
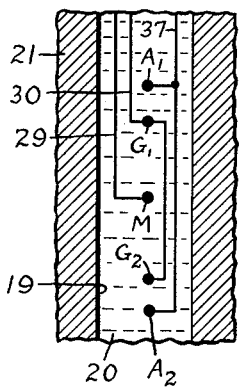
FIG.3.
INVENTOR.
HENRI-GEORGES DOLL
BY
Campbell, Brumbaugh, Free & Graves
HIS ATTORNEYS.

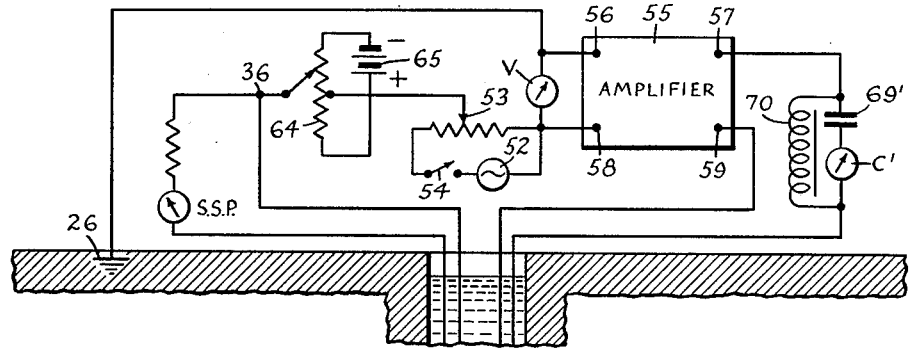
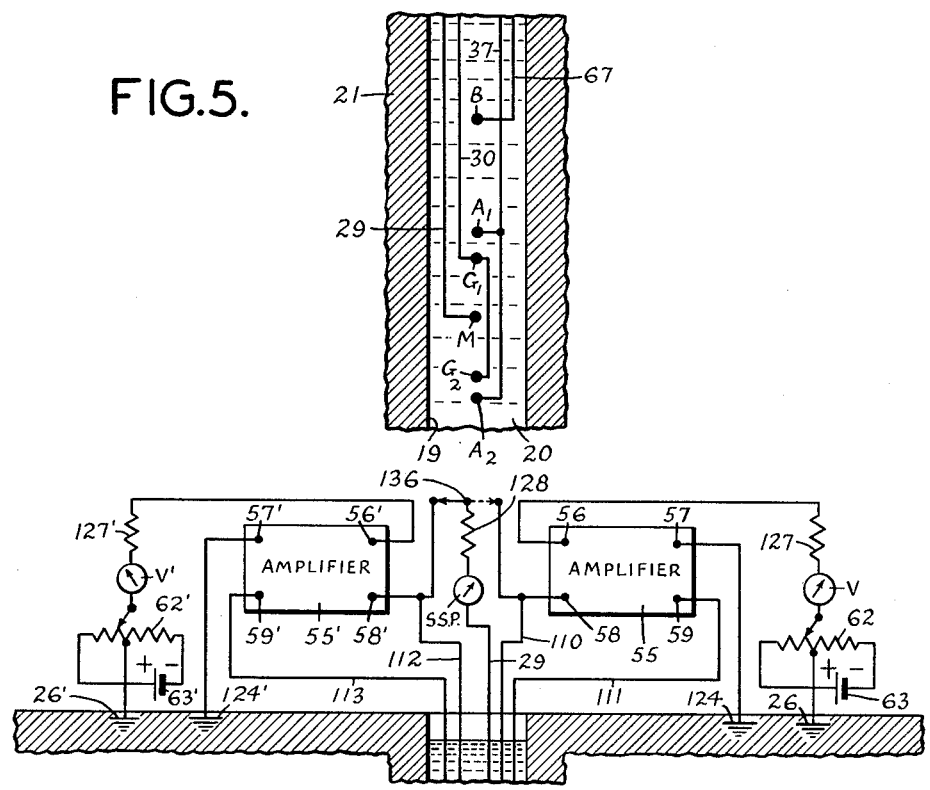
FIG.5.
FIG.6.
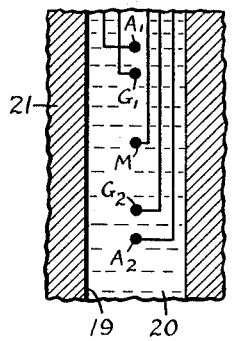
INVENTOR.
HENRI-GEORGES DOLL
BY
HIS ATTORNEYS.

United States Patent Office 2,712,632
Patented July 5, 1955

2,712,632

ELECTRICAL WELL LOGGING METHOD AND APPARATUS

Henri-Georges Doll, Ridgefield, Conn., assignor to Schlumberger Well Surveying Corporation, Houston, Tex., a corporation of Delaware Original application November 18, 1948, Serial No. 60,872. Divided and this application June 3, 1953, Serial No. 359,362

16 Claims. (Cl. 324—1)

The present invention relates to methods and apparatuses for investigating earth formations and more particularly to novel methods and apparatuses for obtaining indications of an electrical property such as the conductivity of the formations traversed by a bore hole.

This application is a division of my copending application Serial No. 60,872, filed November 18, 1948, for "Selective Spontaneous Potential Well Logging Method and Apparatus." It is directed particularly to those embodiments in the parent case that are adapted to provide indications of the electrical conductivity of the earth formations surrounding a bore hole.

One object of the invention, accordingly, is to provide novel well logging methods and apparatus for investigating the electrical conductivity of earth formations traversed by a well drilled into the earth.

Other objects and features of the invention will be apparent from the following detailed description of several typical embodiments thereof, taken in conjunction with the accompanying drawings, in which:

Fig. 1 is a schematic diagram of a typical five-electrode system constructed according to the invention;

Fig. 2(a) illustrates a typical geological column traversed by a bore hole;

Fig. 2(b) is a schematic representation of a log obtained with the apparatus of Fig. 1 in a bore hole like that shown in Fig. 2(a);

Fig. 3 is a schematic diagram of another form of the invention in which the voltage applied to the two parallel connected electrodes in the measuring circuit is controlled automatically;

Figure 4:
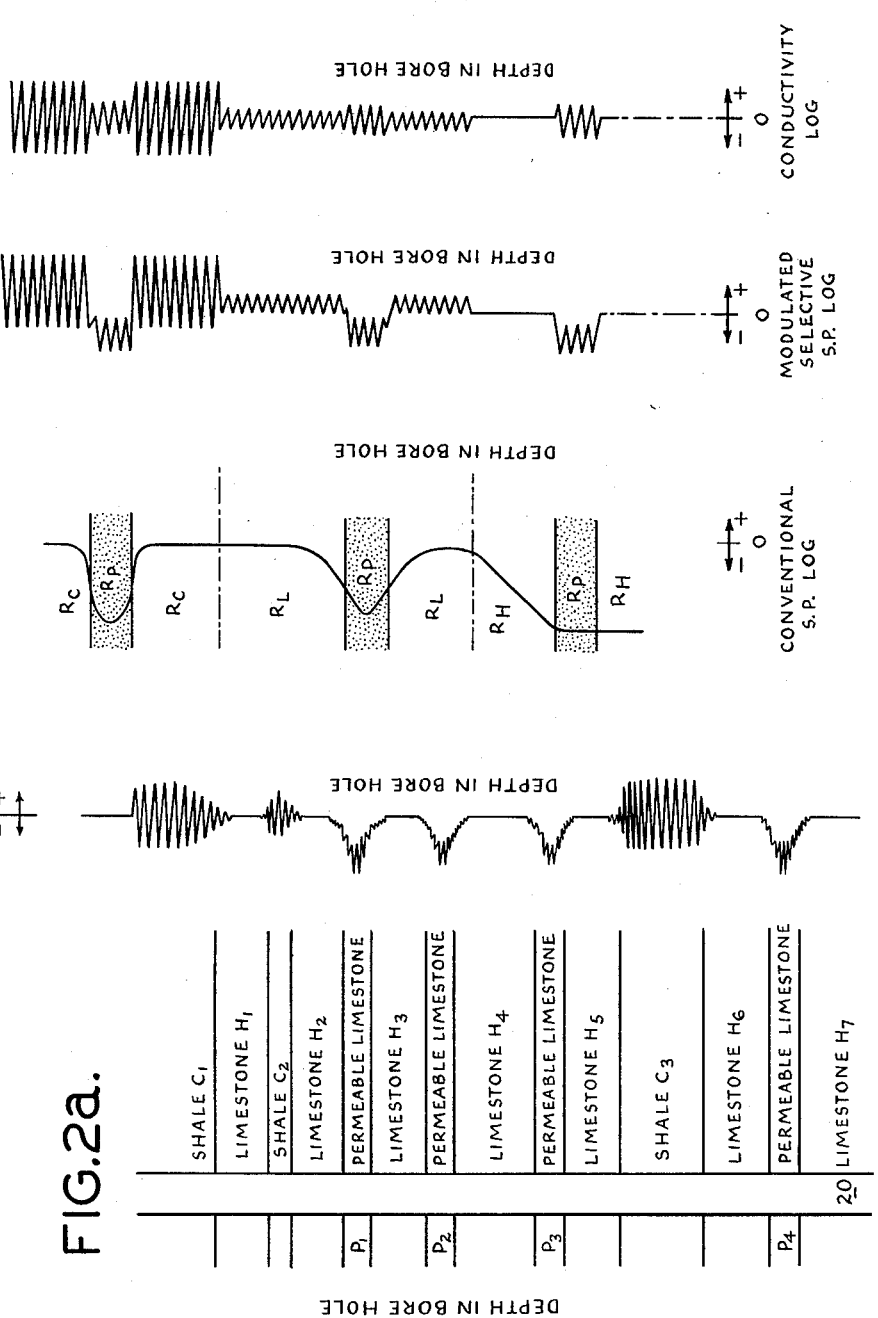

Figs. 4(a), 4(b) and 4(c) show schematically a conventional SP log and representative logs of selective SP and electrical conductivity made according to the invention, respectively;

Fig. 5 is a schematic diagram of a further embodiment which enables a modulated selective SP log and a conductivity log to be recorded simultaneously; and Fig. 6 illustrates schematically another modification in which separate and automatic controls are used for each electrode whose potential is to be controlled.

One embodiment of the invention is shown in Fig. 1. An electrode array is lowered into a bore hole 20 which usually contains conductive mud. The electrode device may comprise, for example, five electrodes $A_1$, $G_1$, M, $G_2$, and $A_2$, maintained at a constant separation. The electrodes $A_1$ and $A_2$ are connected through an insulated conductor 37 to any suitable power source 23 by means of a potentiometer 22. This circuit, which will be called the power circuit hereinafter, is connected to ground at point 24. A. C. from a suitable source 44 is introduced into the power circuit through a transformer 45 having adjustable coupling between the primary and secondary windings thereof. The secondary winding of the transformer 45 is connected in series with the conductor 37 and the potentiometer 22. A switch 46 may be connected in series with the A. C. source 44 and the primary winding of the transformer 45.

In the vicinity of the electrodes $A_1$ and $A_2$ are placed two electrodes $G_1$ and $G_2$ which are connected to an insulated wire 30 and through a resistance 28 to a meter SSP. The other terminal of the meter SSP is connected to another electrode M, through an insulated wire 29. This circuit will hereinafter be called the measuring circuit.

Connected between the conductor 30 to the electrodes $G_1$ and $G_2$ and a ground electrode 26 is a circuit including two branches in parallel. One branch includes a choke coil 47 in series with a high resistance 50 and a D. C. meter $V_1$. The second branch includes a blocking condenser 48 in series with a high resistance 49 and an A. C. meter $V_2$. This part of the circuit will hereinafter be called the control circuit.

The electrode M is situated intermediate the electrodes $G_1$ and $G_2$, while the electrodes $A_1$ and $A_2$ are usually located outside the $G_1$ and $G_2$ electrodes from the electrode M, rather than inside. It is convenient, though not necessary, to use a symmetrical arrangement of these five electrodes, with the electrode M at the center point. In a practical arrangement, the separation distance between the electrodes $G_1$ and $G_2$ may be about eight times the usual bore hole diameter, while the electrodes $A_1$ and $A_2$ may be separated from the corresponding electrodes $G_1$ and $G_2$, respectively, by a distance approximately equal to the radius of the bore hole. However, these distances may be modified appreciably within the scope of this invention.

This group of five electrodes is adapted to be moved along the portion of an open bore hole which contains drilling mud or other conducting fluid. The electrodes are preferably of the impolarizable type; however, in the usual drilling muds, they can be conventional electrodes made of lead, such as are now used in electrical logging.

The power source 23 may comprise a battery or any other suitable source of D. C.; its terminals may be connected to a potentiometer 22 having a contact arm 22$a$ that can be manipulated to vary the magnitude and polarity of the voltage applied between the electrodes $A_1$, $A_2$ and the ground 24. Obviously, any other suitable source of current may be used.

The resistance 28 and the SSP meter together constitute a high resistance millivoltmeter. As such, these two elements could be replaced by an electronic voltmeter, or other potential measuring device; preferably it is adapted to record continuously while the electrode array is moved in the bore hole. Thereby the SSP meter provides a record of the potential difference appearing between the electrode M and the electrodes $G_1$ and $G_2$, which latter electrodes are connected in parallel by the conductor 34. Similarly, the meters $V_1$ and $V_2$ and the resistances 49 and 50, respectively, comprise a pair of high resistance millivoltmeters.

In one method of operation, the potential of the electrodes $G_1$ and $G_2$ is selected as described in connection with Fig. 1 in the aforementioned application Serial No. 60,872, the switch 46 being open. For this purpose, the electrode system is first placed opposite a fairly thick impervious formation of low resistivity in a bore hole. A bed of shale or clay, two or more times thicker than the distance between the electrodes $A_1$ and $A_2$ can be used, for example. While the electrode system is in this position, the D. C. current in the power circuit is adjusted by manipulation of the potentiometer 22 until the SSP meter reads zero, indicating that the D. C. difference of potential between the electrode M and the electrodes $G_1$ and $G_2$ is zero. In this case, the D. C. potential of the electrodes $G_1$ and $G_2$ will be indicated by the meter $V_1$, and it will be maintained constant during a run.

Alternating current is then applied to the apparatus by closing the switch 46 and the variable coupling of the transformer 45 is adjusted until the meter $V_2$ indicates that the desired A. C. potential is being applied to the electrodes $G_1$ and $G_2$. The particular potential employed depends on the results desired, as indicated in greater detail hereinafter.

By way of example, the peak-to-peak A. C. potential may be of such magnitude as to swing the potential of the electrodes $G_1$ and $G_2$ between a maximum value more positive than the D. C. potential of these electrodes and a minimum value more negative than the D. C. value but not as negative as the static SP of the permeable beds. The latter condition will usually be satisfied if the minimum potential value is made less negative than the negative potential that would have to be applied to the electrodes $G_1$ and $G_2$ for a zero reading of the SSP meter when the electrode array is at the level of a permeable formation.

The frequency of the A. C. should preferably be made low enough to enable its effect to be recorded by the SSP meter. However, the SSP meter may be of a type that will record fairly high frequencies, such as a cathode ray tube, for example, in which case any desired frequency can be employed.

After the power circuit has been adjusted as described above, the electrode assembly is moved along the open section of the bore hole under investigation, the readings of meters $V_1$ and $V_2$ being maintained constant during the run.

By way of example, let it be assumed that the apparatus shown in Fig. 1 is lowered into the bore hole 20, shown in Fig. 2(a). In that figure, the bore hole 20 extends through a geological column such as may be encountered in oil fields, where oil may be present in limestone formations. The shale beds $C_1$, $C_2$ and $C_3$ represent impervious formations having a relatively low resistivity namely, of the same order of magnitude as the resistivity of the mud contained in the bore hole. The limestone beds $H_1$, $H_2$, $H_3$, $H_4$, $H_5$, $H_6$ and $H_7$, which are not indicated as permeable, represent impervious formations of much greater resistivity than the shale beds. The permeable limestone beds $P_1$, $P_2$, $P_3$ and $P_4$ represent permeable formations which may be oil, or gas, or water bearing. Because such formations always contain a certain amount of water, their resistivities are less than the resistivity of impervious limestone beds. It is known that the permeable formations are the source of an E. M. F. established by electrofiltration and electrochemical phenomena. This E. M. F. generates currents which flow in the conductive mud of the bore hole and which follow paths extending along the bore hole from the boundary between a permeable stratum and an impervious formation.

The selective SP log obtained by operating in this manner is of the type shown in Fig. 2(b). It will be seen that it corresponds to a selective SP log such as might be recorded with the apparatus shown in Fig. 1 or Fig. 3 of the aforementioned copending application, to which a modulation of variable amplitude is added. The amplitude of the modulation will depend, among other things, on the value of the applied current as determined from the reading of the meter $V_2$, and it will be a function of the apparent electric conductivity of the formation adjacent the electrode assembly in the bore hole.

With the system adjusted as described above, the envelopes of the opposite peak values of the A. C. modulation in Fig. 2(b) will correspond to two different selective spontaneous potential logs. The left-hand peak envelope will indicate the shale beds $C_1$, $C_2$ and $C_3$ of Fig. 2(a) as well as the permeable formations $P_1$, $P_2$, $P_3$ and $P_4$ by deflections towards the left of the base line. However, the deflections at the levels of the shale beds are of lesser amplitude than those at the levels of the permeable formations. From this envelope, therefore, it is possible to distinguish between the shale beds or impervious beds of low resistivity, the permeable beds and the impervious beds having a high resistivity.

On the other hand, the right-hand peak envelope of the A. C. modulation in Fig. 2(b) corresponds to a log in which the shales $C_1$, $C_2$ and $C_3$ are clearly indicated by deflections to the right; permeable beds are indicated by deflections to the left but with less amplitude than previously; and the highly resistive beds are indicated by negligible deflections with respect to the base line.

The D. C. potential and A. C. modulation applied between the electrodes $G_1$ and $G_2$ and ground may be selected according to the type of selective SP log which may be desired. For practical purposes, it has been found that satisfactory results can be obtained if the peak-to-peak magnitude of the A. C. modulating voltage is in the range from 50 to 500 millivolts, although these values are not restrictive.

Instead of impressing a constant D. C. potential between the electrodes $G_1$ and $G_2$ and ground, and modulating it with an A. C. potential of constant peak-to-peak amplitude, two D. C. potentials of different substantially constant magnitudes might be impressed on electrodes $G_1$ and $G_2$ in rapid succession, by means of a suitable power circuit, as disclosed in the copending application mentioned above.

Fig. 3 shows another embodiment of the invention, whereby the control of the potential impressed between electrodes $G_1$ and $G_2$ and ground is automatically maintained at a constant value. In this case, the control potential is applied to the input of a D. C. amplifier, the output of which is connected in the power circuit. The electrodes $G_1$ and $G_2$ are connected through an insulated conductor 30 and in series with suitable sources of D. C. and A. C. voltage to the input terminal 58 of the D. C. amplifier 55. The D. C. voltage source may comprise, for example, a potentiometer 64 energized by a battery 65, and it permits the adjustment of the potential of the electrodes $G_1$ and $G_2$, without affecting the operation of the D. C. amplifier 55; in this manner, contact potentials, for example, such as occur at the electrode 26 and the ground may be counterbalanced. The A. C. voltage source may include, for example, a potentiometer 53 energized by an A. C. generator 52 through a switch 54. The other amplifier terminal 56 is connected to ground at the point 26 and a high resistance meter V is connected to the amplifier terminals 56 and 58.

The electrodes $A_1$ and $A_2$ of Fig. 3 are connected to one output terminal 59 of the amplifier 55, the other output terminal 57 being connected to the ground at the point 24.

The amplifier 55 may be of any conventional type designed to provide a power output that is a function of the voltage input. Furthermore, the connections to the amplifier 55 are so arranged that substantially 100% degenerative feedback obtains between its output and input terminals. Under these conditions, the amplifier 55 tends to keep the voltage across its input terminals to a null value, so that the potential applied between the electrodes $G_1$ and $G_2$ and ground, is maintained substantially constant.

The measuring circuit comprises two branches in parallel and connected to the electrode M and to the electrodes $G_1$ and $G_2$ through the insulated wires 29 and 30, respectively. One of the branches comprises the SSP meter and its resistance 28, while the other branch comprises a recording type indicating instrument C, its resistance 68 and a blocking condenser 69.

In operation, the switch 54 is first opened, and the D. C. potential impressed on electrodes $G_1$ and $G_2$ is adjusted as described above in connection with Fig. 1. Then the switch 54 is closed, thereby permitting a suitable A. C. potential to be impressed on electrodes $G_1$ and $G_2$, and the amplifier 55 is turned on. The action of the amplifier 55 not only maintains the D. C. potential impressed on the $G_1$ and $G_2$ electrodes constant, but also insures that the A. C. potential impressed on said $G_1$ and $G_2$ electrodes is kept constant in magnitude during the logging run. Accordingly, a modulated selective SP log will be recorded by the meter SSP. This log will correspond to the log shown in Fig. 2(b) or the log of Fig. 4(b).

In addition, the alternating potential difference alone will be recorded by the meter C, the direct component being blocked by the condenser 69. It has been found that the amplitude of the A. C. recorded by the meter C is a function of the apparent conductivity of the formation opposite the electrode array. A typical conductivity log recorded by the meter C is illustrated in Fig. 4(c).

Fig. 4(a) shows schematically a geological column comprising some permeable formations $R_p$ of medium resistivity, some impervious strata $R_c$ of low resistivity such as shales or clays, for example, some hard, resistive and impervious formations $R_h$, and some impervious formations $R_L$ of intermediate resistivity. A typical conventional SP log such as might be obtained in a bore hole traversing the column is superimposed on the geological column for convenience.

Fig. 5 illustrates a preferred embodiment of the invention which enables a modulated selective SP log to be recorded simultaneously with a conductivity log, the potentials impressed between the electrodes $G_1$ and $G_2$ and ground 26 being controlled automatically. In this embodiment, the ground 24 is replaced by an electrode B lowered into the bore hole 20 and located at a relatively large fixed distance, say 10 meters, for example, from the other electrodes, so as not to affect appreciably the potential of the other electrodes. It can be seen that the change in the location of the electrode connecting the terminal 57 of amplifier 55 to ground does not modify the operation of the apparatus. Such change could be made in all the other embodiments of the invention without changing the results.

The control circuit of Fig. 5 is identical to the control circuit of Fig. 3 and like parts are designated by like reference characters. The modulated selective SP is measured by means of the SSP meter, as described above in connection with Fig. 3.

On the other hand, the conductivity meter C' is now placed in series with a blocking condenser 69' in the connecting wire between the amplifier terminal 57 and the ground electrode B. In parallel with the meter C' and its condenser 69' is a suitable choke 70. The D. C. supplied by the amplifier to the power circuit will flow through the choke 70, while the A. C. will pass through condenser 69' and meter C' where it will be measured.

As the A. C. potential impressed on the electrodes $G_1$ and $G_2$ is maintained constant, the A. C. flowing in the ground between electrodes $A_1$, $A_2$ and B will vary in direction proportion to the conductivity of the formation. Accordingly, the current measured by meter C' will be proportional to the conductivity of the formation.

In the modification of the invention shown in Fig. 6, the conductors connecting the electrodes $G_1$ and $G_2$ to one another and the electrodes $A_1$ and $A_2$ to one another have been omitted. Instead, two amplifiers 55 and 55', which separately control the potential of each of the electrodes $G_1$ and $G_2$ are used. In some cases, it may be found desirable to use two distinct controls for the electrodes $G_1$ and $G_2$, and this can be done for the various embodiments herein described. The electrode $A_1$ in Fig. 6 is connected to the output terminal 59' of the amplifier 55' through an insulated wire 113, the other output terminal 57' being grounded at 124'. Similarly, the electrode $A_2$ is connected to the output terminal 59 of the amplifier 55 through an insulated wire 111, the other output terminal 57 being grounded at 124.

One control circuit comprises the electrode $G_1$, an insulated wire 112, the input terminal 58' of the amplifier 55', the amplifier terminal 56', a resistance 127', the control meter V', a potentiometer 62' energized by a suitable D. C. source 63' and the ground 26'. The other control circuit comprises the electrode $G_2$, an insulated wire 110, the input terminal 58 of the amplifier 55, the amplifier input terminal 56, a resistance 127, the control voltmeter V, a potentiometer 62 energized by a suitable D. C. source 63 and the ground 26.

The measuring circuit includes the electrode M, the insulated wire 29, the meter SSP with its resistance 128, and the junction point 136.

In operation, the potential impressed on electrodes $G_1$ and $G_2$ is controlled by means of the meters V' and V with their associated potentiometer circuits. Preferably, the potential of electrode $G_1$ is made equal to the potential of electrode $G_2$. The amplifiers 55' and 55 will maintain the potential of the electrodes $G_1$ and $G_2$ constant by supplying appropriate currents through the electrodes $A_1$ and $A_2$.

As the potential of the electrodes $G_1$ and $G_2$ is maintained constant, the meter SSP may be connected between the M electrode and either of the electrodes $G_1$ or $G_2$ at the junction point 136. If the potential of the electrode $G_1$ is made equal to the potential of the electrode $G_2$ the meter SSP may be connected to both electrodes at the point 136. The meter SSP will record a selective SP log as previously described.

From the foregoing, it will be understood that the invention provides a novel and highly effective method and apparatus for investigating earth formations traversed by a bore hole. By utilizing a potential measuring electrode located intermediate two other electrodes, and adjusting the potential of said two electrodes as described herein, indications may be obtained of the electrical conductivity of the earth formations in a novel and effective manner.

In the embodiments described above which employ modulation, the frequency of the modulating signal should preferably be made low enough to avoid undesirable phase shifts in the several circuits. However, higher frequencies may be used provided suitable phase shifting means are employed to compensate for any undesirable phase shifts that may occur.

If it is desired to obtain indications of only the electrical conductivity of the formations, it will be understood that means need not be provided in the foregoing embodiments for maintaining the D. C. potential of the electrodes $G_1$ and $G_2$ constant or for providing indications of variations in the D. C. potential difference between electrode M and the electrodes $G_1$ and $G_2$.

It will be further understood that the several embodiments disclosed herein by way of illustration are susceptible of numerous modifications within the scope of the invention. Other suitable circuit components such as meters, amplifiers, etc., will suggest themselves to persons skilled in the art. The illustrative embodiments described above, therefore, are not to be regarded as limiting in any way the scope of the following claims.

I claim:

1. In a method of investigating earth formations traversed by a bore hole containing a conducting liquid, the steps of disposing in the bore hole at least three longitudinally spaced-apart electrodes, moving said electrodes as a unit to different positions in the bore hole, passing electric current between points near the two outer electrodes of said three and a reference point longitudinally spaced apart therefrom, adjusting the intensity of the current flowing at said points at each of said positions of the electrodes as required to maintain said two outer electrodes at substantially the same potential with respect to a reference point substantially at ground potential, and obtaining indications of variations in the potential difference between the third electrode of said three and at least one of said two outer electrodes.

2. In a method of investigating earth formations traversed by a bore hole containing a conducting liquid, the steps of disposing in the bore hole at least three longitudinally spaced-apart electrodes, moving said electrodes as a unit to different positions in the bore hole, passing electric current between points near the two outer electrodes of said three and a reference point longitudinally spaced apart therefrom, adjusting the intensity of the current flowing at said points at each of said positions of the electrodes or required to maintain said two outer electrodes at a substantially constant potential with respect to a reference point substantially at ground potential, and obtaining indications of variations in the average potential difference between the third electrode of said three and each of said two outer electrodes.

3. In a method of investigating an electrical property of earth formations traversed by a bore hole containing a conducting liquid, the steps of disposing in the bore hole at least three longitudinally spaced-apart electrodes, moving said electrodes as a unit to different positions in the bore hole, passing periodically varying current between a reference point longitudinally spaced apart from said electrodes and two points located near the two outer electrodes, respectively, of said three, adjusting the intensity of the current flowing at said points at each of said positions of the electrodes as required to maintain said two outer electrodes at a substantially constant periodically varying potential with respect to a reference point substantially at ground potential, and obtaining indications of variations in periodically varying potential difference between the third electrode of said three and said two outer electrodes.

4. In a method of investigating an electrical property of earth formations traversed by a bore hole containing a conducting liquid, the steps of disposing in the bore hole at least three longitudinally spaced-apart electrodes, moving said electrodes as a unit to different positions in the bore hole, passing periodically varying current between a reference point longitudinally spaced apart from said electrodes and two points located near the two outer electrodes, respectively, of said three, adjusting the intensity of the current flowing at said points at each of said positions of the electrodes as required to maintain said two outer electrodes at a substantially constant periodically varying potential with respect to a reference point substantially at ground potential, and obtaining indications of variations in the intensity of the current flowing at said points.

5. In a method of investigating earth formations traversed by a bore hole containing a relatively conductive liquid, the steps of lowering into the bore hole at least three longitudinally spaced-apart electrodes, moving said electrodes as a unit to different positions in the bore hole, passing electric current between a first point near one of the outer electrodes of said three and a reference point longitudinally spaced apart therefrom, adjusting the intensity of the current flowing at said first point at each of said positions of the electrodes as required to maintain said one outer electrode at a substantially constant potential with respect to a reference point substantially at ground potential, passing electric current between a second point near the other of said outer electrodes of said three and a reference point longitudinally spaced apart therefrom, adjusting the current flowing at said second point at each of said positions of the electrodes as required to maintain said other outer electrode at a substantially constant potential with respect to a reference point substantially at ground potential, and obtaining indications of variations in the potential difference between the third electrode of said three and at least one of said outer electrodes.

6. In well logging apparatus, the combination of an electrode array adapted to be lowered into a bore hole, said array comprising inner and outer pairs of longitudinally spaced-apart electrodes and an electrode intermediate the electrodes of said inner pair, a source of electrical energy connected to the electrodes of one of said pairs and to a reference point longitudinally spaced apart therefrom, said source being responsive to the potential of the electrodes of the other pair with respect to ground for controlling the potential of said other pair of electrodes to maintain the same at a reference value with respect to ground, and means for obtaining indications of the potential difference between said intermediate electrode and said other pair of electrodes.

7. In apparatus for investigating thte electrical conductivity of earth formations traversed by a bore hole containing a conductive liquid, an electrode array adapted to be passed through the bore hole, said array comprising inner and outer pairs of longitudinally spaced-apart electrodes and an electrode intermediate the electrodes of said inner pair, means responsive to the potential of said inner pair of electrodes with respect to ground for passing alternating current from the electrodes in said outer pair to a reference point longitudinally spaced apart therefrom for automatically maintaining said inner pair of electrodes at substantially the same potential with respect to ground, and means for obtaining indications of the potential difference between said intermediate electrode and said inner pair of electrodes.

8. In well logging apparatus, the combination of an electrode array adapted to be lowered into a bore hole, said array comprising inner and outer pairs of longitudinally spaced-apart electrodes and an electrode intermediate the electrodes of said inner pair, amplifier means having input terminals connected to a reference point longitudinally spaced apart from said electrodes and to one of said pairs of electrodes, respectively, and having output terminals connected to a reference point substantially at ground potential and to said other pair of electrodes, respectively, said amplifier means being connected for degenerative feedback between the output and input terminals thereof, a source of voltage connected in series with said amplifier input terminals, and means for obtaining indications of the potential difference between said intermediate electrode and said one pair of electrodes.

9. In well logging apparatus, the combination of an electrode array adapted to be lowered into a bore hole, said array comprising inner and outer pairs of longitudinally spaced-apart electrodes and an electrode intermediate the electrodes of said inner pair, amplifier means having input terminals connected to a reference point longitudinally spaced apart from said electrodes and to one of said pairs of electrodes, respectively, and having output terminals connected to a reference point substantially at ground potential and to said other pair of electrodes, respectively, said amplifier means being connected for degenerative feedback between the output and input terminals thereof, a source of periodically varying voltage connected in series with said amplifier input terminals, and means for obtaining indications of periodically varying potential difference between said intermediate electrode and said one pair of electrodes.

10. In well logging apparatus, the combination of an electrode array adapted to be lowered into a bore hole, said array comprising inner and outer pairs of longitudinally spaced-apart electrodes and an electrode intermediate the electrodes of said inner pair, amplifier means having input terminals connected to a reference point longitudinally spaced apart from said electrodes and to one of said pairs of electrodes, respectively, and having output terminals connected to a reference point substantially at ground potential and to said other pair of electrodes, respectively, said amplifier means being connected for degenerative feedback between the output and input terminals thereof, a source of periodically varying voltage connected in series with said amplifier input terminals, and means connected in circuit with said amplifier output terminals for obtaining indications of a periodically varying signal in said amplifier output.

11. In well logging apparatus, the combination of an electrode array adapted to be lowered into a bore hole, said array comprising inner and outer pairs of longitudinally spaced apart electrodes and an electrode intermediate the electrodes of said inner pair, first alternating current source means having terminals connected to a reference point longitudinally spaced apart from said electrodes and to one electrode in one of said pairs, respectively, second alternating current source means having terminals connected to a reference point longitudinally spaced apart from said electrodes and to the other electrode of said one pair, respectively, means for maintaining the electrodes of said other pair at substantially the same potential with respect to ground, and means for obtaining indications of the potential difference between said intermediate electrode and at least one of the electrodes of said other pair.

12. In well logging apparatus, the combination of a plurality of electrodes mounted for movement through a bore hole in spaced apart relation, adjustable means for passing electric current between one of said electrodes and a reference point longitudinally spaced apart therefrom, and means responsive to potential difference between another of said electrodes and a reference point longitudinally spaced apart therefrom for controlling said adjustable means to maintain said potential difference at a reference value.

13. In a method of investigating an electrical property of earth formations traversed by a bore hole containing a conducting liquid, the steps of disposing in a bore hole at least three longitudinally spaced apart electrodes, moving said electrodes as a unit to different positions in the bore hole, passing current between a reference point longitudinally spaced apart from said electrodes and two points located near the two outer electrodes, respectively, of said three, adjusting the intensity of the current flowing at said points at each of said positions of the electrodes as required to maintain said two outer electrodes at a substantially constant potential with respect to a reference point substantially at ground potential, and obtaining indications of a function of the intensity of the current flowing at said points.

14. A method of making an electric log of the formations adjacent a well which contains an electrically conductive medium, that comprises introducing a first electrical current into a first portion of said electrically conductive medium in a manner such that said first electrical current will have a substantial vertical component, introducing a second electrical current of a polarity opposite to that of said first electrical current into a second portion vertically spaced from said first portion of said electrically conductive medium in a manner such that said second electrical current will have a substantial vertical component, whereby the flow of the vertical components of the current in opposite directions in said portions will create a region between said portions of substantially equal potential with respect to remote portions of said electrically conductive medium, detecting variations in said potential, employing said detected variations to maintain the region of equal potential between said first and second portions of said electrically conductive medium and obtaining indications of a function of the current conducted between said equal potential region and the formation adjacent thereto.

15. A method of making an electric log of the formations adjacent a well which contains an electrically conductive medium, that comprises introducing a first alternating electrical current into a first portion of said electrically conductive medium in a manner such that said first alternating electrical current will have a substantial vertical component, introducing a second alternating electrical current of an instantaneous polarity opposite to that of said first electrical current into a second portion vertically spaced from said first portion of said electrically conductive medium in a manner such that said second alternating electrical current will have a substantial vertical component, whereby the instantaneous flow of the vertical components of the alternating current in opposite directions in said portions will create a region between said portions of substantially equal potential with respect to remote portions of said electrically conductive medium, detecting variations in said potential, employing said detected variations to maintain the region of equal potential between said first and second portions of said electrically conductive medium and obtaining indications of a function of the alternating current conducted between said equal potential region and the formation adjacent thereto.

16. A method of making an electric log of the formations adjacent a well which contains an electrically conductive medium, that comprises introducing a first electrical current into a first portion of said electrically conductive medium in a manner such that said first electrical current will have a substantial vertical component, introducing a second electrical current of a polarity opposite to that of said first electrical current into a second portion vertically spaced from said first portion of said electrically conductive medium in a manner such that said second electrical current will have a substantial vertical component, whereby the flow of the vertical components of the current in opposite directions in said portions will create a region between said portions of substantially equal potential with respect to remote portions of said electrically conductive medium, detecting variations in said potential, employing the detected variations to vary the electrical current introduced into one of said portions of the conductive medium to reestablish said region of equal potential, and obtaining indications of potential difference between longitudinally spaced apart points in said region.

References Cited in the file of this patent

UNITED STATES PATENTS

| | | |
|---|---|---|
| 2,084,143 | Hummel | June 15, 1937 |
| 2,347,794 | Piety | May 2, 1944 |
| 2,446,303 | Owen | Aug. 3, 1948 |
| 2,592,125 | Doll | Apr. 8, 1952 |